United States Patent Office 3,721,546
Patented Mar. 20, 1973

3,721,546
METHOD FOR PRODUCTION OF ALUMINUM
Tadahisa Shiba, Junzo Tsuruki, Masaru Takahashi, Kunihiro Goto, and Isao Ono, Tokyo, Japan, assignors to Showa Denko Kabushiki Kaisha, Tokyo, Japan
No Drawing. Continuation-in-part of abandoned application Ser. No. 651,370, July 6, 1967. This application Aug. 11, 1970, Ser. No. 63,015
Claims priority, application Japan, July 13, 1966, 41/45,355, 41/45,356
Int. Cl. C22b 9/10, 21/02; C22d 7/02
U.S. Cl. 75—10                                1 Claim

ABSTRACT OF THE DISCLOSURE

A method for the production of aluminum of high purity which consists exclusively of the steps of reducing alumina with carbon in an arc furnace, thereby obtaining an aluminum-containing composition, then maintaining the aluminum-containing composition at a temperature within the range of 1400° C. to 2000° C. on a filter in a vessel, whereby the aluminum is extracted alone and separated from the composition through the filter.

---

The present invention is a continuation-in-part application of our co-pending U.S. patent application Ser. No. 651,370, filed on July 6, 1967, and now abandoned.

The present invention relates to a method for the production of aluminum.

In conventional methods for the production of aluminum by carbon reduction, there are the methods of U.S. Pat. No. 2,829,961, the same No. 2,974,032, and other like methods, wherein aluminum, which alone cannot be taken out of an electric furnace is taken out as a melt accompanied by aluminum carbide ($Al_4C_3$) and small amounts of $Al_4O_4C$, etc., then solidified and thereafter passed through a melt of alkali halide to separate the aluminum from the aluminum carbide. Also, there is the method of German Pat. No. 1,188,818, wherein an aluminum-containing composition is ground by a grinder heated at a temperature of around 700° C., and sieved to separate the aluminum alone. However, these conventional methods are defective in that, because they all require after-treatments, the operational efficiency is low, and moreover, the purity of the resulting aluminum is low, so these methods are not carried out on a commercial basis at present.

It is an object of the present invention to provide a method for the production of aluminum of high purity which consists exclusively of the steps of reducing alumina with carbon in an arc furnace, heating the aluminum-containing composition, obtained by the reducing of the alumina with carbon, at 1400–2000° C. on a filter in a vessel, and extracting and separating the aluminum alone from the composition through the filter, with no additional steps required, which comprises reducing alumina with carbon in an arc furnace and maintaining the resulting aluminum-containing melt at a temperature at which an aluminum carbide film is not completely formed in the melt, thereby extracting and separating the aluminum alone from the melt.

It is another object of the present invention to provide a method of producing aluminum of high purity easily by heating an aluminum-containing composition obtained by reducing alumina with carbon in a vessel.

It is still another object of the present invention to provide a method of producing aluminum of high purity simply and effectively by reducing alumina with carbon in an arc furnace without requiring the after-treatments used in conventional methods.

With these and other objects and other characteristic features in view, which will become apparent from the following complete description and examples given in detail, the present invention will be clearly understood.

An aluminum-containing melt obtained by reducing alumina with carbon is extremely fluid at temperatures of above 2200° C. because, at such temperatures, the aluminum and aluminum carbide remain completely dissolved, but, at lower temperatures, the fluidity gradually decreases and, at 1300° C., the fluid cannot be seen. This is because, as the temperature lowers, the aluminum carbide in the melt begins to crystallize out and, at about 1900° C., forms a thin film, which film, as the temperature is further lowered, gradually covers the aluminum so as to enclose it in small chambers formed of the film. When the temperature is lower than 1300° C., the film completely encloses the aluminum in these chambers; thus, despite the aluminum being still molten, the fluid cannot be seen.

The present inventors conducted experiments, wherein 1 kg. of a composition consisting of about 80% of aluminum and about 20% of aluminum carbide produced by reducing alumina with carbon in an arc furnace was placed on a perforated graphite partition plate provided at the middle of a graphite crucible embedding in an electric furnace, and was kept heated for 5 minutes and for 1 hour, respectively, at each temperature within the range of from 1300° C. to 2000° C., as shown in Table 1 and Table 2 presented below. Incidentally, the graphite crucible was provided at one side of its bottom section with a tap hole, and the bottom section was inclined so as to allow the aluminum melt which flows down through the plate to gather towards the tap hole.

TABLE 1

| Heating temperature (° C.) | 1,300 | 1,400 | 1,500 | 1,600 | 1,700 | 1,800 | 1,900 | 2,000 |
|---|---|---|---|---|---|---|---|---|
| Al yield (wt. percent) | 0 | 4.3 | 6.8 | 12.2 | 23.5 | 24.9 | 23.6 | 2.8 |
| Ratio of $Al_4C_3$ mixed (wt. percent) | 0 | 0 | 0 | 0 | 0 | 0 | Trace | 0.01 |

Remarks: Heating was maintained for 5 minutes at each temperature.

TABLE 2

| Heating temperaturee (° C.) | 1,300 | 1,400 | 1,500 | 1,600 | 1,700 | 1,800 | 1,900 | 2,000 |
|---|---|---|---|---|---|---|---|---|
| Al yield (wt. percent) | 0 | 5.1 | 30.1 | 30.2 | 29.3 | 2.1 | 0.9 | 0.3 |
| Ratio of $Al_4C_3$ mixed (wt. percent) | 0 | 0 | 0 | 0 | 0 | 0 | Trace | 0.01 |

Remarks: Heating was maintained for 1 hour at each temperature.

At the heating temperature of 1300° C., the composition on the partition plate did not flow down through the holes of the plate, but, at 1400–1700° C., the higher the temperature, the larger the amount of the aluminum melt tapped through the holes, while, at above 1800° C., the higher the temperature, the smaller the amount because most of the melt was already tapped. Samples from the resulting melts were spectroscopically analyzed, with the result that, surprisingly, the melt obtained under heating up to around 1800° C. consisted essentially of aluminum having purity as high as 99.6%, the presence of aluminum carbide not being observed, and, in the melt obtained under heating at around 1900° C., only a trace of aluminum carbide was observed. Thus, after heating for 5 minutes and for 1 hour at each temperature within the range of from 1300° C. to 2000° C., 98.1% and 98.0%, respectively, of the aluminum in the composition was extracted.

The above-mentioned experiments made it clear that the aluminum enclosed in the small chambers formed of a thin film of aluminum carbide flows out breaking a part of the film, and that the aluminum carbide mostly remains in unbroken small-chamber form on the partition plate in the electric furnace. Upon examining this residue through a microscope, it was observed that there was an indication that a part of the wall between the respective adjacent chambers was broken to form a continuous narrow passage through which the aluminum alone passed to flow out. The residue, when lightly crushed, easily turned into fine powder, which, when analyzed, was found to contain about 8.0 of aluminum. Also, the structure of the aluminum samples obtained by systematic random-start sampling while the aluminum was being tapped under heating at the above-mentioned respective temperatures was examined through a microscope, but, in the samples other than those obtained at above 1900° C., the presence of aluminum carbide was not observed.

As mentioned above, at the temperatures of from 1400° C. to 1600° C., the aluminum, because of its fluidity, flows out breaking an easily breakable part of the aluminum carbide film, but, at the temperatures of 1600–2000° C., a part of the aluminum carbide film which forms small chambers dissolves in the aluminum enclosed in said chambers, which are thereby broken in part to allow the aluminum therein to flow out. This phenomenon occurs in all of the chambers, which, when broken in part, are interconnected by a narrow passage formed therethrough and the whole aluminum present in the chambers flows out along this passage; thus, the aluminum can be obtained in high yields. At temperatures below 1800° C., the amount of aluminum carbide which dissolves in the aluminum is so small that, in the extracted-separated aluminum, the presence of aluminum carbide is not observed, but, at 1900° C., the amount thereof present in the aluminum is only a trace and, at 2000° C., it is extremely small. Accordingly, 2000° C. is recognized to be a critical temperature at which aluminum carbide begins to contaminate the aluminum to be extracted and separated.

Through the above experiments, the present inventors discovered a method of producing aluminum of high purity consisting exclusively of the steps of heating, an aluminum-containing composition obtained by initially reducing alumina with carbon, at a temperature within the range of 1400–2000° C. on a filter made of perforated graphite plate or graphite chip, in a vessel, and thereby extracting and separating the aluminum alone from the composition through the filter. The filter used in the present invention is not limited to those made of graphite, but, for example, those made of alumina refractory or boron nitride, or the like and others may also be used so long as they can withstand high temperatures.

On the basis of the above method, the present inventors further developed a method of producing aluminum of high purity directly by charging alumina and carbon into an arc furnace heated at the arc reaction part at about 2400° C. and at the lower part at a temperature at which the aluminum carbide film is not completely formed. That is, in this method, the melt of alumina reduced with carbon in the arc reaction part of the arc furnace is kept heated at 2200–2300° C. at the upper layer and at 1400–2000° C. at the lower layer so as to form a thin film of aluminum carbide in the lower layer of the melt and fluidize the aluminum while the film is not completely formed in the melt. The aluminum carbide which, losing its fluidity, has crystallized out remains in that condition and gradually accumulates to form a filter layer. This filter layer is kept almost constant in thickness because the upper part thereof is reacted as the aluminum carbide accumulates. The aluminum-containing melt formed in the arc reaction part flows down continuously to fill the small chambers in the upper part of the accumulated filter layer, with the result that the aluminum carbide further crystallizes out and the aluminum alone is tapped along the passage through which the former aluminum passed. As the temperature of the arc reaction part rises, the accumulated aluminum carbide layer becomes thin, so the temperature of the product in the furnace near the tap hole becomes high within the range of 1400–2000° C. and, accordingly, the amount of aluminum to be tapped increases, while, to the contrary, if the temperature of the arc reaction part lowers, the accumulated aluminum carbide layer becomes thick and, accordingly, the amount of aluminum to be tapped decreases. Further, if the temperature of the lower part of the product in the furnace near the tap hole exceeds 2000° C., the aluminum carbide dissolves in the aluminum, making it impossible to obtain aluminum of high purity.

In the present invention, steps such as the purification by flux treatment of an aluminum-containing composition, or the grinding and sieving thereof, etc. which are required in conventional methods are all dispensed with, and, moreover, the aluminum carbide in the composition can be recovered easily and reused.

The present invention is further illustrated but not limited thereto by the following specific examples.

EXAMPLE 1

A vessel with a graphite crucible embedded therein was used, the graphite crucible being provided at the middle with a perforated graphite partition plate and at the bottom with a tap hole connected with a pipe for discharging aluminum out of the crucible and said crucible having a capacity of 3000 cm.$^3$ above the partition plate and a capacity of 4000 cm.$^3$ below the plate. The vessel was designed so that the material on the partition plate could be heated up to 2000° C. and the inside temperature of the vessel could be measured by an optical pyrometer.

3 kg. of a roughly ground composition containing 78.3% aluminum and 21.7% aluminum carbide was charged onto the partition plate in the abovementioned vessel and was maintained at each temperature within the range of from 1500° C. to 1900° C. After heating at 1500° C. for 20 minutes, 310 g. of aluminum, then, at 1600° C. for 20 minutes, 450 g. of aluminum, and, at 1700° C. for 20 minutes, 620 g. of aluminum, and further, at 1800° C. for 20 minutes, 870 g. of aluminum, were trapped out respectively, the total amount of aluminum thus obtained corresponding to 95.8% of the aluminum content in the composition.

During tapping, samples of the products aluminum were collected by systematic random-start sampling and spectroscopically analyzed, with the result that the products obtained under heating at from 1500° C. to 1800° C. were found to have an average purity as high as Al 99.6%, the remainder being Fe 0.20%, Si 0.15%, Ti 0.008% and Mn 0.004%. In the aluminum obtained at 1900° C., some amount of aluminum carbide was observed. Also, on the partition plate, about 700 g. of aluminum carbide, etc. remained.

EXAMPLE 2

In this example, a 100 kw. single-phase arc furnace was used, the furnace having alumina lining applied to the inner side and also having embedded in the lower part thereof a graphite crucible with a graphite rod fixed, the graphite rod extending out to contact the atmosphere.

The furnace was charged with feed material, alumina and carbon, and operated with an arc voltage of 40 v. and an arc current of 1500 amp to maintain the arc reaction part of the furnace at about 2400° C., the upper layer of the resulting aluminum-containing melt at 2200–2300° C., the lower layer of the melt at 2000–2200° C., and the vicinity of the tap hole at 1400–2000° C., respectively.

After about 4 hours, the tap hole was opened. The product in the furnace near the tap hole was in semi-solid form and the temperature of the product near the tap hole was measured to be 1700° C. by an optical pyrometer. Upon the product being poked at with the graphite rod, the aluminum began to flow out and was tapped continuously. Aluminum samples collected by systematic random-start sampling during tapping were spectroscopically analyzed, and, in consequence, they were found to have an average purity as high as Al more than 99.5%, the remainder being Fe 0.21%, Si 0.14%, Ti 0.012% and Mn 0.04%.

Incidentally, it was possible to continue the operation of the arc furnace by charging the feed material continuously.

EXAMPLE 3

In this example, a 500 kw. three-phase arc furnace was used. The furnace was charged with feed materials, alumina and carbon, and operated with an arc voltage of 30 v. and an arc current of 2000 amp to maintain the bottom of the furnace at gradually varied temperature suitable for tapping the aluminum alone.

After a lapse of 25 hours, the tap hole was opened. The temperature of the product near the tap hole was measured to be 1700–2000° C. The aluminum was tapped continuously. Aluminum samples collected in the same way as in Exampes 1 and 2 were spectroscopically analyzed, and, in consequence, they were found to have an average purity as high as Al 99.6%, the remainder being Fe 0.20%, Si, 0.12%, Ti 0.11% and Mn 0.002%. In the samples, even a trace of aluminum carbide was not observed.

Incidentally, even when the tap hole was once closed and then reopened after a lapse of several hours, and, even when the same operation was repeated, it was possible to tap the aluminum in the same way as before. Also, it was possible to continue the operation of the arc furnace by charging the feed materials continuously while tapping the aluminum. Further, even when the operation of the arc furnace was once stopped for several hours and then started again by charging the feed materials, it was likewise possible to continue the operation without any hindrance.

The present invention obtains an aluminum of high purity solely by the steps of reducing alumina with carbon in an arc furnace thereby obtaining an aluminum-containing composition and then maintaining the aluminum-cotaining composition at a temperature within the range 1400–2000° C. on a filter in a vessel, and extracting and separating the aluminum alone from the composition on the filter, with no additional steps being required.

The aluminum-containing melt which has been obtained by reducing alumina with carbon is fluid at temperatures of above 2200° C., because at such temperatures, the aluminum and aluminum carbide remain completely dissolved. However, at lower temperatures the fluidity decreases gradually and at reaching 1300° C. the aluminum fluid becomes completely enclosed in small chambers of crystallized aluminum carbide, the aluminum carbide having crystallized and being solid completely at this temperature.

According to the present invention the aluminum-containing composition is maintained at a temperature within the range of 1400–2000° C. on a filter. As clearly shown in Table 1 and Table 2, respectively, within this temperature range of 1400–2000° C. the aluminum enclosed in the small chambers of the aluminum carbide flows out, a part of the walls of the aluminum carbide crystals breaking, parts of the walls between respective adjacent aluminum carbide chambers becoming broken and forming a continuous narrow passage through which the pure aluminum liquid alone passes out (which is a surprising result, further the tables indicating this surprising result, where, only upon reaching the highest temperature ranges in the table do any traces of aluminum carbide occur in the removed aluminum). Accordingly with the present invention a high degree of purity and in the aluminum yield is achieved, yet with a very simple and heretofore unexpected and previously not realized method. Additionally the present invention provides a method for the production of aluminum of high purity in an arc furnace, comprising the steps of reducing alumina with carbon in an arc furnace in a reaction zone maintained at between 2400–2000° C. producing a melt, passing the melt to a cooling zone in the arc furnace maintained at about 2000° C. at a portion in contact with the reaction zone and at about 1400° C. at a lower portion thereof so that the aluminum carbide content of the melt solidifies to form a filter, and then separating and extracting only the aluminum through the filter.

The present invention makes it possible to separate the aluminum by the simple method of maintaining the aluminum containing material under the particular heat conditions.

Although the fact that at temperatures between 800° C.–1800° C. the aluminum is liquid and surrounded by solid aluminum carbide, heretofore a method of producing aluminum was not known which could be practical for obtaining aluminum of high purity by a separation method comprising merely the steps of maintaining the aluminum-containing material under particular heat conditions, without requiring after-treatments and other steps of the prior art.

While we have disclosed several examples of the present invention, it is to be understood that these examples are given by illustration only and not in a limiting sense.

We claim:
1. The method for the production of aluminum of high purity in an arc furnace, comprising the steps of
   reducing alumina with carbon in an arc furnace in a reaction zone maintained at between 2400–2000° C., producing a melt,
   passing said melt to a cooling zone in said arc furnace maintained at about 2000° C. at a portion in contact with said reaction zone and at about 1400° C. at a lower portion thereof so that the aluminum carbide content of said melt solidifies to form a filter, and
   separating and extracting only the aluminum through said filter.

References Cited

UNITED STATES PATENTS

| | | | |
|---|---|---|---|
| 3,410,680 | 11/1968 | Sparwald | 75—68 |
| 3,068,092 | 12/1962 | Menegoz | 75—94 |
| 2,829,961 | 4/1958 | Miller | 75—68 |
| 2,776,884 | 1/1957 | Grunert | 75—68 |
| 2,974,032 | 3/1961 | Grunert | 75—10 |

FOREIGN PATENTS

| | | | |
|---|---|---|---|
| 831,637 | 3/1960 | Great Britain | 75—68 |
| 964,792 | 7/1964 | Great Britain | 75—68 |

WINSTON A. DOUGLAS, Primary Examiner

P. D. ROSENBERG, Assistant Examiner

U.S. Cl. X.R.

75—63, 68, 94